United States Patent [19]
Moran et al.

[11] 3,935,457

[45] Jan. 27, 1976

[54] DIELECTRIC MATERIAL FOR DOSIMETERS

[75] Inventors: Paul R. Moran, Madison, Wis.;
Ervin Podgorsak, Toronto, Canada;
Gary D. Fullerton, Madison, Wis.;
Gene E. Fuller, Ridge, N.Y.

[73] Assignee: Wisconsin Alumni Research Foundation, Madison, Wis.

[22] Filed: Aug. 16, 1974

[21] Appl. No.: 497,874

[52] U.S. Cl. .............................. 250/336; 250/472
[51] Int. Cl. ............................................. G01t 1/16
[58] Field of Search .......... 250/336, 337, 472, 473, 250/483, 484; 357/29

[56] References Cited
UNITED STATES PATENTS 3,450,879  6/1969  Seppi .................................. 250/336

*Primary Examiner*—Davis L. Willis
*Attorney, Agent, or Firm*—McDougall, Hersh & Scott

[57] ABSTRACT

A dosimeter having a dielectric material such as sapphire wherein the efficiency as measured by mean drift distance and trapping efficiency is increased by making use of a dielectric material in which the total active impurity does not exceed 50 ppm and in which any one active impurity does not exceed 10 ppm.

13 Claims, No Drawings

DIELECTRIC MATERIAL FOR DOSIMETERS

The invention described herein was made in the course of work under a grant or award from the Department of Health, Education, and Welfare and NSF Grant No. GH-34585 awarded by the National Science Foundation.

This invention relates to radiation dosimetry and to other fields of use where it is desired to measure or observe radiation and it relates more particularly to improved materials used in radiation dosimetry and methods of preparation of same.

Radiation dosimetry systems are employed monitoring the environment, and in hospitals, clinics, laboratories and other establishments where x-rays, gamma rays, beta rays and other forms of penetrating radiation are used, to guard against the possibility that workers in the establishment may be exposed accidentally to unsafe amounts of such radiation. Radiation dosimetry systems are also employed in connection with therapeutic use of x-rays, gamma rays and other forms of penetrating radiation in the treatment of patients, to monitor and record the amount of radiation which is employed in the treatment of each patient.

Various radiation dosimetry systems are known. One common system involves the use of film badges or tags which are worn by persons who may possibly be exposed to penetrating radiation. Such film badges contain photographic film which is surrounded by opaque material so that the film is protected from exposure to light. X-rays or other penetrating radiation will pass through the opaque material and will cause darkening of the film when it is developed. Periodically the film is removed from each badge and is developed and inspected to determine whether the film has been exposed to penetrating radiation. This dosimetry system has the disadvantage that the procedures involved in developing and checking the films are time consuming and costly. moreover this system is not well adopted for accurately measuring the dosage of penetrating radiation to which each film has been exposed.

Another system involves the thermoluminescence (TL) which is produced in certain materials when they are exposed to x-rays, gamma rays and other forms of ionizing radiation. Examples of such materials are lithium fluoride and calcium fluoride. In this dosimetry system, each worker or patient wears a badge or the like containing a small piece or sample of such thermoluminescent material. Periodically, each sample is checked for thermoluminescence by heating it while observing and measuring any light which may be emitted by the sample. The light may be measured by using an optical system to focus it upon a photo-multiplier tube, employed in conjunction with the associated electronic amplifiers and electrical measuring equipment. If the sample has been exposed to x-rays or other ionizing radiation, it will emit light as it is heated through certain characteristic temperature ranges. If the emitted light is plotted against the temperature, one or more peaks will be observed at characteristic temperatures. The magnitude of these peaks is a measure of the amount of radiation exposure. This dosimetry system has the disadvantage that elaborate and highly sensitive measuring equipment is required to measure the thermoluminescence. Electrical noise impairs the accuracy of the measurements at low levels of thermoluminescence, for which the signal to noise ratio is low. It is difficult to achieve reproducible results because the results are affected by the optical quality of the sample. Moreover, it is hard to standardize the adjustment of the optical system.

Ionizing radiation absorbed in a dielectric solid generates pairs of mobile electrical charges, electrons and holes. Within a very short time, typically $10^{-9}$ and $10^{-6}$ seconds, some fraction of these recombine restoring the material to its original condition, and the remaining charges become trapped and immobilized at binding sites in the material. To avoid verbal complexity, the following descriptions speak of the electrons as the dynamically active charges. In a particular material, in a particular temperature range, however, the positively charged holes may, in reality, be the dynamically active charges.

Radiation induced thermally activated current (RITAC) dosimetry devices operate on the following phenomena: Long after irradiation, the stably trapped electrons may be thermally remobilized by heating the material. As a consequence of this thermal remobilization, the electrons ultimately recombine or retrap at energetically deeper binding sites of greater thermal stability. If an electrical voltage is applied across the material during heating, then the period of thermal remobilization of the electrons is detected as a transient electrical current flowing in the external circuit leads. The total electrical charge transported, or the peak current at a known reproducible heating rate, yields a measure of the total dose of ionizing radiation absorbed.

The RITAC effects can be employed in various ways for the measurement of the amount and type of radiation to which a material has been exposed.

In the copending application Ser. No. 290,726, filed Sept. 20, 1972 and now abandoned, description is made of an extremely sensitive dosimetry method and materials, having very favorable signal to noise ratios involving the use of radiation induced thermally activated depolarization (RITAD) which can be produced in a large number of different dielectric materials. Examples of such materials are calcium fluoride, strontium fluoride, barium fluoride, lithium fluoride, sodium fluoride, aluminum oxide, magnesium oxide, and beryllium oxide. It is believed that virtually any dielectric material may be employed if it is refined to a sufficient degree of purity and if the remaining impurities are sufficiently controlled.

In the RITAD method of the present invention, a sample of the dielectric material is given an electrostatic bias polarization so that internal or local electrostatic fields are produced within the sample. This is preferably done by providing a pair of electrodes on opposite sides of the sample, heating the sample to a more or less elevated temperature, impressing an external voltage between the electrodes to subject the sample to an external electrostatic field, and cooling the sample so as to freeze in the bias polarization which is produced by the external electrostatic field. The voltage is maintained during the cooling operation and is then removed so that the sample may be placed in a badge or other holder. After the voltage has beeen removed, the electrodes are preferably short circuited to prevent the accumulation of static charges on the electrodes. The sample is then carried by a worker or patient, or is otherwise used in a situation where it may be exposed to the penetrating radiation which is to be measured.

Exposure to radiation causes depolarization with corresponding changes in the polarization of the sample. Periodically, each sample is checked for such polarization by connecting the electrodes into a measuring circuit which includes a sensitive ammeter, capable of measuring any small currents which may flow through the circuit between the electrodes. The sample is then heated so as to raise its temperature in a progressive manner, preferably at a more or less constant rate. It has been found that if the sample has been exposed to x-rays, gamma rays or other ionizing radiation, one or more current peaks will be observed at characteristic temperatures. Such current peaks are not observed if the sample has not been exposed to radiation. The magnitude of the observed current peaks is a measure of the radiation dosage.

If the sample is heated to a sufficiently high temperature, the bias polarization will be neutralized, which will cause another current peak. This peak is observed whether or not the sample has been exposed to radiation. However, the magnitude of this peak decreases gradually with increasing radiation dosage, particularly at extremely high levels of radiation dosage.

The electrical current signals due to the RITAD effect are strong and easy to measure and are remarkably free from noise. Thus, the signal to noise ratio is high. The sample can be reused repeatedly.

In the copending application Ser. No. 346,720, filed Apr. 2, 1973, description is made of another mode for utilization of thw RITAC effect for the measurement of exposure to radiation. This mode, which involves radiation induced thermally activated polarization (RITAP), makes use of any of the materials which are suitable for RITAD dosimetry. In this method, the dielectric body is not given an initial bias depolarization, but is left unpolarized.

The initially unpolarized dielectric body is exposed to the dosage of radiation which is to be measured. The electrodes on the opposite sides of the dielectric body are then connected into a circuit which includes a current measuring instrument and a source of unidirectional voltage. The energy level of the dielectric body is then progressively increased, preferably by heating the body so as to increase its temperature. As the body is heated, a polarization current peak is observed. This current peak is not present if the body has not been exposed to radiation. The magnitude of the polarization current peak is a measure of the radiation dosage.

After the polarization current peak has been observed, it is preferred to remove the voltage source from the circuit so that the current measuring instrument is connected directly across the electrodes on opposite sides of the dielectric body. With further heating of the dielectric body, one or more depolarization current peaks are observed and measured. The direction of the depolarization current is opposite from the direction of the polarization current. The magnitude of the depolarization current peaks is also a measure of the radiation dosage. Generally, the depolarization current peaks correspond to the depolarization current peaks which are observed in carrying out the RITAD method, as previously described.

It has now been found that these RITAC effects can be employed efficiently and effectively in an electrical conductance mode, hereinafter referred to as thermally stimulated conductance (TSC).

TSC phenomena, due to optical irradiation of photoconductors, have been studied since the middle 1950's, and for x-ray, gamma-ray, and charged particle irradiation since the early 1960's. These effects have not, to the best of our knowledge, previously been used on or proposed for sensitive radiation dosimetry applications. The reason is that the minimum detectable dose had heretofore been very large, typically $10^3$ to $10^6$ rad.

For certain uses, TSC has a number of advantages and is preferred:

a. with pure TSC, the dosimeter can be used many successive times without high temperature annealing and without having to calculate a recalibration factor caused by polarization buildups from previous exposure;

b. electrode selection and attachment designed to produce TSC mode may result in a more mechanically reliable device configuration;

c. a (TAP/D) advantage is that it will work with any kind of dosimeter fabrication such as active powders in inert matrices, sintered or ceramic constructions which do not possess electrical conductance integrity.

It is an object of this invention to identify and to provide a method for selecting RITCA materials which can be used in RITAP, RITAD and TSC modes whereby routine measurements can be made of dosages less than $10^{-3}$ rads.

Before proceeding with a description of the invention, it will be helpful to define, as explicitly as possible, terms to be used which are relevant to the process of charge trapping, storage, and transport in solid dielectrics. For convenience, reference is made to electrons as the dynamically active charge species, although in a particular case it might actually be the holes. It is desirable to avoid verbal confusion since, for example, the site which we call a "recombination-center" for an electron is also a "trapping-center" for a hole.

1. A first requirement is that some fraction of the electrons and holes generated by ionizing irradiation must be trapped into an immobile state which is thermally metastable at the irradiation temperature of the device. Furthermore, electrons must be thermally remobilized from these states at higher temperatures, but not so high that the material itself structurally decomposes or becomes electrically conductive due to other mechanisms. These trapping sites are referred to as "metastable traps." Examination has been made of two different kinds of such traps. In one, the metastable traps are impurity centers in the host material, and in the other, the metastable traps are intrinsic distortions of the material, self-generated by the transient radiation-induced presence of the mobile charges.

2. The fraction of electrical charges which do not trap disappear via recombination of the electron-hole pairs. This recombination may occur via an intrinsic state (excitonic recombination) or it may occur at large recombination cross-section impurity sites in the material. The latter is referred to as recombination centers. A well known example is thallium in sodium iodide.

3. In addition to the recombination process, some charges might become unavailable for operation of the device because they trap at very energetically deep trapping sites. Remobilization from these deep traps typically requires such high temperatures that the device material has become conductive through mechanisms unrelated to radiation exposure, e.g., impurity related or intrinsic ionic conductivity. Another aspect of these deep traps is that, although they may originally compete only negligibly with the metastable traps, they do play a role as retrapping centers once the electrons are thermally remobilized from the metastable traps. Because of this, they are referred to as "retrapping centers."

4. Finally, there are other thermally activated electrical charge transport processes in solids which are essentially independent of radiation. Most frequently, these are induced by certain grown-in impurity states in the host material. If these effects are large and if they occur in temperature ranges close to those characterizing the RITAC readout, they produce a background signal which can obscure the desired RITAC signal generated at small doses. These states are referred to as the "background centers."

The foregoing is a skeletal description involving four kinds of states in the host material which are relevant to utilization of the RITAC effect. The actual situation in certain particular materials may involve additional complexities. For example, what has been called simply "retrapping" may be an indirect process actually involving intermediate recombination. Physically, however, the result is the same, and considerable intricacy can be avoided by speaking in terms of the conceptually simpler mechanisms.

Initial Trapping Efficiency

To produce a single electron-hole pair in a typical solid, about 10–20 eV of energy must be absorbed from the ionizing radiation. Only some fraction of those become metastably trapped. The radiation sensitivity of RITAC devices is proportional to concentration of metastably trapped charges. Previous experimentation on nominally high purity dielectrics show that the observable metastably trapped fraction is extremely small. Reference can be made to the recent work by Wagner and Mascarenhas [Physical Review Letters, 27, 1514 (1971)]. Their work shows that $CaF_2$, even when doped to ~500 ppm with cerium to give strong electron metastable trapping, yields one metastably trapped electron for each $10^3 - 10^4$ eV of absorbed energy. It has long been presumed that the small metastable trapping efficiencies were observed because the material's intrinsic recombination was overwhelming. Thus, to increase trapping efficiency, the materials are doped to very high levels with metastable trapping centers.

We have discovered that this heavy doping is not necessary to promote useful fractions of metastably trapped charges. It appears that intrinsic recombination is actually very small. The overwhelming effect seems to be impurity-induced recombination. Even in nominal high purity samples (~0.999), there are still ~$10^3$ ppm of various impurities which provide large cross-section recombination. If, instead of doping with metastable traps, one purifies the material to remove recombination centers, one can achieve good trapping efficiency. In actual experiments, it has been found that, if the impurity level is reduced below approximately 10 ppm in $CaF_2$, then we can obtain a metastably trapped charge pair for about 30–45 eV of absorbed energy. This trapping efficiency is 25–30 percent, and is much more than adequate for sensitive RITAC effect dosimetry.

Thus either heavy doping with metastable traps while leaving the recombination center concentrations large, or selective purification to reduce recombination center concentrations while leaving only trace concentrations of metastable traps can be effective in yielding large charge trapping fractions. If it were not for the recombination centers, a maximum value of 10 ppm of metastable traps would assure that the device would reach ~$10^3$ rad. before saturating the system. The normally used heavy doping procedure is ineffective in promoting high RITAC sensitivity for the following reasons:

Mean Drift Length

When an electron is thermally remobilized in the RITAC effect, it begins to drift in an electric field applied to the device. The charge transport signal contributed to the externally observed electrical current is proportional to the mean drift distance of the electron before either recombining or retrapping. If the attempt is made to improve trapping efficiencies by heavily doping with trapping centers, then the tendency is equally to increase the probability that an electron will trap spatially close to a hole. As a result of the strong electrostatic attraction between the electron and hole, such preferentially close spacing promotes very rapid recombination upon thermal remobilization. Thus, although the trapping efficiency increases in proportion to the heavy doping of nominally pure materials, the mean drift distance is inversely proportional to the metastable trap doping. Since the RITAC signal is proportional to the product of these two quantities, its sensitivity remains at the same small value, characterizing the nominal high purity solid, independent of increased doping levels. This is not the case for dosimetry techniques (e.g. TL) whose readout occurs upon recombination.

On the other hand, by selective purification of the recombination centers, in accordance with the concepts of this invention, we increase the trapping fraction and decrease the probability for highly spatially correlated trapped electrons and holes. In this event, the mean drift distance and the trapping effiency are simultaneously enhanced; very high RITAC sensitivity results. As little as 1 ppm of metastable traps is sufficient for 25–30 percent trapping efficiency provided that recombination center concentrations are reduced to about 10 ppm. Of course, retrapping as well as recombination limits the mean drift distance. Mean drift distances of $10^{-5} - 10^{-4}$ cm are more than adequate for sensitive RITAC readout. It has been found that this can be achieved by reducing the retrapping center concentrations also below ~10–20 ppm by selective purification.

Background Conductance and Polarization

As one increases the voltage applied during RITAC readout, the measured signal increases. At some point, the RITAC signal becomes substantially greater than noise injected by the measuring ammeter; typically this occurs at an applied electric field of about $10^2$ volts/mm. A further increase in voltage does not actually increase the useful sensitivity. This is because there always exist radiation independent background currents. These limit the smallest detectable dose and, like the RITAC signal itself, increase in proportion to the applied voltage.

Even in an ideal perfect dielectric, intrinsic ionic conductivity will begin to manifest itself at high temperatures. To minimize this background, the host material itself should be chosen for its low ionic conductance. This implies a dielectric of very high molecular binding energy which, in turn, implies a high melting point. Examples are the alkaline earth oxides, BeO, MgO, etc., or trivalent metal oxides, such as $Al_2O_3$ or $La_2O_3$. Another intrinsic conduction is due to edge currents at the periphery of the device. These, however, are easily eliminated by employing a three terminal (guard ring) RITAC geometry.

Of greater concern than intrinsic high temperature conductance, is impurity-induced ionic conductance. Ionic impurity complexes can dissociate and contribute relatively mobile ions at temperatures well below that where intrinsic conductances become important. Besides acting as an undesirable background, these ionic currents seem to perform a useful function. The electrical transport which they provide can be the mechanism by which electrons and holes, occupying deep trap or retrapping sites, are neutralized. Thus they may play an important role in the high temperature, preexposure, annealing process which erases all memory of previous irradiations of the sample. Usually this is important for dosimeter re-use once accumulated exposures prior to annealing rise to the level of $\sim 10^3$ rad.

Consequently, the impurity levels contributing to high temperature background conductance should be sufficiently low that they do not interfere at the RITAC readout temperature, but sufficiently high that the sample may be rapidly annealed at some reasonably elevated temperature. We have found that ionic conductance generated by impurities will be satisfactory in relation to intrinsic conductances if the impurity level is reduced below 10–20 ppm in typical materials.

Another background signal comes from impurity radicals or molecules which possess a local electrical dipole moment. Rather than dissociating at high temperatures, these local-dipole impurities become thermally reorientable. This produces a thermally activated polarization or depolarization background signal. Over the thermal breadth of a RITAC readout peak, one part per million of these dipolar impurities yield a background charge transport of $10^{-14}$ to $10^{-13}$ coulombs per cm$^2$ at an applied field of $10^2$ volts/mm. A sensitive RITAC peak itself yields something like $10^{-10}$ coulombs per cm$^2$ per rad at the same field, $10^2$ volts/mm. As a general rule, the RITAC signal at minimum detectable dose should be at least 10 percent of background for personnel dosimetry applications. The minimum dose may be assumed to be about $10^{-3}$ rad, which corresponds to about $10^{-13}$ coulombs. Thus the local-dipole polarization background signal should be no larger than $10^{-12}$ coulombs, which corresponds to about 10 ppm of the dipolar impurity complexes.

The preceding paragraph assumed RITAC readout by a continuous thermal scan. There are other possibilities; for example, a rapid scan up to but stopping at approximate temperature of the RITAC peak followed by isothermal readout of the RITAC signal. This procedure seems relatively cumbersome and inconvenient compared with a constant rate temperature scan, but it will largely eliminate most dipolar-impurity background signals. Since all the other active impurities, however, must also be removed to the 10 ppm level, similar purification for the local-dipolar entities does not add much, if any, additional materials refining.

Materials Purification and Monitoring

From the foregoing, it can be seen that each of the several active impurity states should exist at levels no greater than about 10 ppm. This implies total impurity levels of less than about 50 ppm; such materials classify as ultra-high purity solids rather than nominally high purity solids. Multiple zone refining can give much better than the 50 ppm purity. Practically speaking, it is very probable that simple multiple pulling of the solid from the molten state while retaining only the first pulled half is a sufficient refining procedure for the 50 ppm levels desired.

It is helpful, however, to have tests by which each of the active impurity states may be monitored for a quality control in material refining. Such tests are also helpful for already existing commercially available ultra-high purity materials so they may be pre-selected for usefulness in sensitive RITAC dosimetry.

A. For background impurity states, electrical measurements are most direct. Criteria are based on the assumption that the desire is for a dosimeter stable for several month's storage at room temperature before readout. For this purpose, sapphire has been found to give most desirable results. This is believed to be the first use made of sapphire as a RITAC material and its usage in the purified state represents one of the important inventive concepts described and claimed in this application. For sapphire ($Al_2O_3$), the most sensitive RITAC peak occurs at approximately 220°C. A good rule in monitoring ionic conductance is to increase the temperature about 120°–130°C above that for the RITAC peak utilized. At this temperature, and for an applied field of a few hundred volts per millimeter, the ionic current should not exceed about $10^{-12}$ amperes per cm$^2$. (See E. B. Podgorski, Rh. D thesis, University of Wisconsin, June 1973, for procedures for monitoring for ionic conductance effects). If it is much greater, then the ionic complex impurities generating the ionic conductance must be further refined out to achieve lower levels.

B. The background levels due to local-dipole impurities may be sensitively and simply monitored by the ionic thermo-current (ITC). In brief, one heats the sample to just below the onset of ionic conductivity. A voltage is applied ($\sim 100$ v/mm) while the sample is rapidly cooled below $\sim 100°K$ (i.e. $-170°C$) in a liquid nitrogen cyrostat. The sample electrodes are shorted through a sensitive ammeter and a return thermal scan to high temperatures initiated. A number of thermally activated depolarization (TAD) charge release peaks may be observed. A total TAD charge release of $2 \times 10^{-12}$ coulombs/cm$^2$ corresponds to a dipole impurity concentration of about 1 ppm. Thus, if the charge release exceeds about $10^{-11}$ coulombs/cm$^2$ (10 ppm local-dipole impurities), the material must be further purified to insure that the RITAC readout will be at least 10 percent of background for a one millirad dose. Any TAD charge release peaks which occur well above ($>100°C$) the RITAC peak temperature will not contribute interfering backgrounds.

C. To monitor the levels of the recombination centers and retrapping centers, a number of techniques may be employed. Perhaps the most general is to measure the optical absorption of the sample in the near u.v. at wavelengths just below that of the fundamental first exciton absorption edge. The first exciton state is a highly pair-wise correlated electron-hole state. If there are recombination centers they will, by definition, interact strongly with the excitonic state and, at the very least, enhance the long wavelength tails of its optical absorption band. Similarly, deep traps (retrapping centers) should also interact strongly with electrons or holes and therefore perturb the fundamental optical absorption.

The way the unperturbed optical absorption tails should fall off with increasing wavelength is calculatable from an empirical rule, well known as Urbach's Law. The percentage by which the integrated optical absorption in the tails is enhanced above the total first exciton absorption yields directly the percentage of recombination and trapping centers. Our rule is that the aggregate should be reduced below about 30 ppm; i.e., $3 \times 10^{-4}$ percent.

Another rule for the excitonic perturbation is that the impurity-linked optical absorption structure will show an optical density of 1 cm$^{-1}$ over a 1000 A wavelength band for approximately 1 ppm. Thus, if the wavelength integrated optical absorption structure is greater than about $3 \times 10^4$(A/cm), then the material concentration of recombination and trapping centers exceeds 30 ppm. The material should be further refined.

D. Some recombination centers and some retrapping centers can often be specifically identified. Frequently these impurity atoms are paramagnetic. Electron paramagnetic resonance (EPR) spectra on the material at low temperatures can easily detect paramagnetic atom levels of tenths of hundredths of a part per million. EPR monitoring can serve a dual role. First, prior to irradiation as described above, it may be employed as a backup to the optical measurements to monitor aggregate impurity levels of the paramagnetic species. Second, after a test irradiation, low temperature EPR can reveal trapped electrons and holes, both of which are paramagnetic. The trapped electron and hole concentrations should be at least $10^{14}$ cm$^{-3}$ for a $10^3$ rad dose. If not, then recombination center concentrations are too large and should be reduced by additional refining. Furthermore a series of pulse annealing (isochronal) experiments (referenced in G. E. Fuller, Ph.D Thesis, University of Wisconsin, October 1973) will show whether the trapping is dominated by the desired metastable traps or by an overabundance of the undesired deep trap retrapping centers.

E. We have discovered that all active impurity levels should be reduced to about the same value, i.e. around 3-10 ppm. This is true for the retrapping centers, recombination centers, local-dipole background centers, ionic conductance background impurities, and the metastable traps. In addition, the metastable traps should not be reduced much below a few ppm to avoid early dose saturation of the device. This implies equal levels of each of the active impurities, the aggregate level being less than 30-50 ppm. Thus the most simple refining appears to be one of the non-specific segregation techniques. In brief, one starts with a nominally pure large crucible of melt and pulls out about 50 percent in the solid form. This 50 percent is remelted, and 50 percent of it pulled. At some point, depending upon the refining facility cleanliness, the aggregate impurity levels will be reduced below 30-50 ppm.

Then the most simple and sensitive way to monitor for low active impurity levels is actually to do a RITAC dosimetry experiment on a sample of the batch.

In regard to the background signals, we have found the source of one of the significant ones. It appears that a dirty interface between electrode and dielectric generates substantial background. Therefore, in addition to cleaning up the bulk material of the dielectric, it is desirable also to clean up the surfaces carefully, prior to electrode evaporation. For example, a simple alcohol rinse leaves background limiting low-dose to ~10-20 millirad. Multiple rinses with surface heating and a final distilled water rinse removes microscopically observed residues and reduces background by a factor of 50 to give lower dose limits of ~100 microrad.

Improving sensitivity under non-optimum impurity levels

In some cases it may prove, unfortunately, that impurity related metastable traps which have the appropriate thermal remobilization temperature either will not enter easily into the host or else have a very small capture cross-section. The general type of impurities required to give appropriate remobilization temperatures may be estimated once the host material is selected. Within the broad category, however, the specific impurity should be arrived at by empirical trial.

The RITAC sensitivity may be too small for practical uses, even after the other impurity levels are reduced to an economically feasible level. It is highly probable that a further processing step might increase the sensitivity above background signals to a practical level.

The basic idea is that the sensitivity increases proportionally to the mean drift distance at a given applied field. It is known that, for 25 percent initial trapping efficiency, a mean drift distance of $10^{-5} - 10^{-4}$ cm at 100 v/mm is adequate for millirad level dosimetry. Furthermore, the mean drift distance under those circumstances is limited by retrapping centers. The concentration of active retrapping centers can be reduced either by additional purification or by pre-filling them with charge carriers.

Consequently, the procedure would be to heat the sample to a temperature just above the desired RITAC peak readout and to pre-irradiate. This produces free charges which would selectively fill up the retrapping centers. If it does not also produce enhanced recombination, then one will have greatly increased the mean drift distance. Until the sample is annealed at very high temperatures it should exhibit an enhanced low dose sensitivity.

The following is an example of the preparation of material having the desired purity level, prepared from sapphire ($Al_2O_3$).

The sapphire is heated in a crucible to a temperature of 2100°-2150°C. After all of the material has been reduced to the molten state, the material is slowly allowed to cool.

When 50 percent of the melt has been solidified, the solid portion is drawn off and the removed solid portion remelted in a clean crucible by heating back to a temperature of 2100°-2150°C.

This procedure is repeated through three complete cycles at which time the active impurities in the drawn off solid phase will be well below 50 ppm with no active impurity exceeding 10 ppm. The active impurities fall generally within the range of about 30-35 ppm with the individual active impurities falling within the range of 3-5 ppm.

The prepared material, when used as the active material in a dosimeter, is characterized by extremely high sensitivity.

The aforementioned copending applications are incorporated herein by reference of examples of RITAP and RITAD modes of radiation dosimetry, utilizing the high purity material described and claimed therein.

It will be understood that changes may be made in the details of construction, arrangement and operation, without departing from the spirit of the invention, espe-

We claim:

1. In the measurement of radiation, a dosimeter which makes use of a dielectric material in which the level of active impurities total less than 50 ppm, and in which the level of any one active impurity does not exceed 10 ppm.

2. A dosimeter as claimed in claim 1 in which the level of active impurities in the dielectric material is within the range of 30–50 ppm and in which the level of any one active impurity is within the range of 3–10 ppm.

3. A dielectric material for use in a dosimeter employed in the measurement of radiation by absorption comprising an inorganic oxide selected from the group consisting of an alkaline earth metal oxide and a trivalent metal oxide in which the level of active impurities total less than 50 ppm, and in which the level of any one active impurity does not exceed 10 ppm.

4. A dielectric material as claimed in claim 3 in which the total active impurities is within the range of 30–50 ppm and in which any individual active impurity is within the range of 3–10 ppm.

5. A dielectric material as claimed in claim 3 in which the inorganic oxide is selected from the group consisting of beryllium oxide, magnesium oxide, aluminum oxide, and lanthanum oxide.

6. A dielectric material for use in the measurement of radiation by absorption comprising sapphire having a level of active impurity which does not exceed 50 ppm and in which the level of any one such active impurity does not exceed 10 ppm.

7. A dielectric material as claimed in claim 6 in which the total of active impurities in the sapphire is within the range of 30–50 ppm.

8. A dielectric material as claimed in claim 6 in which the level of any one active impurity is within the range of 3–10 ppm.

9. A dosimeter for the measurement of radiation, in which the dosimeter makes use of a dielectric material in which at a temperature of 120°–130°C above that for the RITAC peak utilized and an applied field of a few hundred volts per millimeter, the ionic current does not exceed $10^{-12}$ amperes per cm$^2$.

10. A dosimeter for the measurement of radiation in which the dosimeter makes use of a dielectric material in which the radiation independent background charge release associated with impurity states does not exceed $10^{-11}$ coulombs/cm$^2$.

11. A dosimeter for the measurement of radiation in which the dosimeter makes use of a dielectric material in which the wavelength integrated optical absorption structure produced by impurities in the material does not exceed $3 \times 10^4$ A/cm.

12. A dosimeter for the measurement of radiation in which the dosimeter makes use of a dielectric material in which the trapped electron and hole concentration is at least $10^{14}$ cm$^{-3}$ for a $10^3$ rad dose.

13. A dosimeter for the measurement of radiation in which the dosimeter makes use of a dielectric material in which at a temperature of 120°–130°C above that for the RITAC peak utilized and an applied field of a few hundred volts per millimeter, the ionic current does not exceed $10^{-12}$ amperes per cm$^2$, in which the background signal charge release does not exceed $10^{-11}$ coulombs/cm$^2$, in which the wavelength integrated optical absorption structure from impurities does not exceed $3 \times 10^4$ A/cm, and in which the trapped electron and hole concentration is at least $10^{14}$ cm$^{-3}$ for a $10^3$ rad dose.

* * * * *